United States Patent [19]

Coleman, Jr.

[11] Patent Number: 5,778,108
[45] Date of Patent: Jul. 7, 1998

[54] METHOD AND SYSTEM FOR DETECTING TRANSITIONAL MARKERS SUCH AS UNIFORM FIELDS IN A VIDEO SIGNAL

[75] Inventor: E. North Coleman, Jr., Ortonville, Mich.

[73] Assignee: Electronic Data Systems Corporation, Plano, Tex.

[21] Appl. No.: 660,641

[22] Filed: Jun. 7, 1996

[51] Int. Cl.$^6$ .................................................. H04N 9/74
[52] U.S. Cl. .......................... 382/305; 348/700; 395/328
[58] Field of Search ................................. 382/305, 306, 382/272, 273; 348/699, 700, 701; 395/328, 806, 807

[56] References Cited

U.S. PATENT DOCUMENTS

| | | | |
|---|---|---|---|
| 4,249,207 | 2/1981 | Harman et al. | 348/152 |
| 4,931,868 | 6/1990 | Kadar | 348/155 |
| 5,091,780 | 2/1992 | Pomerleau | 348/152 |
| 5,091,963 | 2/1992 | Litt et al. | 382/8 |
| 5,151,945 | 9/1992 | Lee et al. | 382/103 |
| 5,177,794 | 1/1993 | Abe et al. | 382/107 |
| 5,245,436 | 9/1993 | Alattar | 358/182 |
| 5,262,855 | 11/1993 | Alattar et al. | 358/133 |
| 5,293,456 | 3/1994 | Guez et al. | 395/24 |
| 5,317,398 | 5/1994 | Casavant et al. | 348/570 |
| 5,365,273 | 11/1994 | Correa et al. | 348/452 |
| 5,485,611 | 1/1996 | Astle | 395/600 |
| 5,508,750 | 4/1996 | Hewlett et al. | 348/558 |
| 5,521,841 | 5/1996 | Arman et al. | 364/514 A |
| 5,544,239 | 8/1996 | Golin et al. | 382/236 |
| 5,561,477 | 10/1996 | Polit | 348/700 |
| 5,565,998 | 10/1996 | Coombs et al. | 386/46 |
| 5,606,655 | 2/1997 | Arman et al. | 395/140 |
| 5,642,239 | 6/1997 | Nagai | 360/8 |
| 5,642,294 | 6/1997 | Taniguchi et al. | 364/514 R |
| 5,654,772 | 8/1997 | Mester et al. | 348/700 |

FOREIGN PATENT DOCUMENTS

| | | | |
|---|---|---|---|
| B25592 | 7/1995 | Australia. | |
| 2218507 | 11/1989 | United Kingdom | G06K 9/46 |

OTHER PUBLICATIONS

"Automatic Parsing of News Video" by H. Zhang, Y. Gong, S. W. Smoliar and S. Yeo Tan, from International Conference on Multimedia Computing and Systems, May 14–19, 1994, pp. 45 through 54 plus cover page.

"The Automatic Real-Time Analysis of Film Editing and Transition Effects and Its Applications" by P. Aigrain and P. Joly, from Computers and Graphics, Jan. 1994, vol. 18, No. 1, pp. 93 through 103.

"Impact: An Interactive Natural-Motion-Picture Dedicated Multimedia Authoring System" by H. Ueda, T. Miyatake and S. Yoshizawa from Reaching Through Technology CHI '91 Conference Proceedings, Apr. 27–May 2, 1991, pp. 343 through 350 plus cover page.

"Multiple Views of Digital Video" by E. Elliott, from MIT Media Laboratory Interactive Cinema Group Project Report, Mar. 23, 1992, 4 pages.

(List continued on next page.)

*Primary Examiner*—Leo Boudreau
*Assistant Examiner*—Dmitry A. Novik
*Attorney, Agent, or Firm*—David G. Wille; L. Joy Griebenow

[57] ABSTRACT

A method and system for detecting transitional markers such as uniform images in a digital video signal made up of a series of video images is disclosed. One aspect of the invention is a method for detecting uniform fields. The method comprises segmenting a plurality of the video images into a number of cells, each cell comprising a number of pixels, each pixel associated with an intensity value representing the intensity of the pixel. Then, a plurality of cell contrast vectors each associated with one of the segmented video images is generated. Each element of the cell contrast vector is associated with one of the cells of the video image and comprises the standard deviation of the pixel intensity values for the pixels in that cell. A uniform image is detected for a video image in response to the cell contrast vector for that image.

14 Claims, 4 Drawing Sheets

OTHER PUBLICATIONS

"Video Parsing Using Compressed Data" by H. Zhang, C. Y. Low, Y. Gong and S. W. Smoliar from SPIE Image and Video Processing II Proceedings, Feb. 7–9, 1994, vol. 2182, pp. 142 through 149 plus cover page.

"Developing Power Tools for Video Indexing and Retrieval" by H. Zhang and S. W. Smoliar, from SPIE Storage and Retrieval for Image and Video Databases II, Feb. 7–8, 1994, vol. 2185, pp. 140 through 149 plus cover page.

"Scene Change Detection and Content-Based Sampling of Video Sequences" by B. Shahraray, from SPIE Digital Video Compression: Algorithms and Technologies 1995, Feb. 7–10, 1995, vol. 2419, pp. 2 through 13 plus cover page.

"Scene Change Detection in a MPEG Compressed Video Sequence" by J. Meng, Y. Juan and S. Chang, from SPIE Digital Video Compression: Algorithms and Technologies 1995, Feb. 7–10, 1995, vol. 2419, pp. 14 through 25 plus cover page.

"Scene Decomposition of MPEG Compressed Video" by H. C. Liu and G. L. Zick, From SPIE Digital Video Compression: Algorithms and Technologies 1995, Feb. 7–10, 1995, vol. 2419, pp. 26 through 37 plus cover page.

"Temporal Segmentation of Videos: A New Approach" by M. Cherfaoui and C. Bertin, from SPIE Digital Video Compression: Algorithms and Technologies 1995, Feb. 7–10, 1995, vol. 2419, pp. 38 through 47 plus cover page.

"Wisard; A Radical Step Foward In Image Recognition" by I. Aleksander, W. V. Thomas and P.A. Bowden, Sensor Review, Jul., 1984, pp. 120–124.

METHOD AND SYSTEM FOR DETECTING TRANSITIONAL MARKERS SUCH AS UNIFORM FIELDS IN A VIDEO SIGNAL

CROSS-REFERENCE TO RELATED APPLICATIONS

This application is related to U.S. application Ser. No. 08/660,354, filed on Jun. 7, 1996 by E. North Coleman, Jr. and entitled "Method and System for Detecting Cuts In A Video Signal," pending.

This application is related to U.S. application Ser. No. 08/660,257, filed on Jun. 7, 1996, by E. North Coleman, Jr. and entitled "Method and System for Detecting Dissolve Transitions In A Video Signal," pending.

This application is related to U.S. application Ser. No. 08/660,564, filed on Jun. 7, 1996 by E. North Coleman, Jr. and entitled "Method and System for Detecting Fade Transitions In A Video Signal," pending.

This application is related to U.S. application Ser. No. 08/660,292, filed on Jun. 7, 1996 by E. North Coleman, Jr. and entitled "Method and System for Detecting The Type Of Production Media Used To Produce A Video Signal," pending.

These applications have all been assigned to Electronic Data Systems Corp. of Plano, Tex.

TECHNICAL FIELD OF THE INVENTION

This invention relates generally to video signal processing and more particularly to a method and system for detecting transitional markers such as uniform fields in a video signal.

BACKGROUND OF THE INVENTION

A typical television commercial, television program, or movie comprises a series of video clips pieced together. For example, if a scene in a television program is being filmed by cameras at three different locations in a room, that particular scene may include a series of video clips wherein each of the clips was originally recorded by one of the three cameras. A particular video clip is normally separated from an adjacent video clip using a common video transitional marker such as a cut, dissolve, or fade. Blank or uniform fields may also be used to provide visual separation between video clips.

As digital storage becomes more economical, owners of rights to video recordings have begun to digitally archive those recordings. Digital archiving allows video owners to easily preserve old video recordings that are in danger of deterioration or destruction. Digital archiving also allows video owners to separate recordings into individual clips for marketing purposes. For example, a clip from a television program or a movie might be used in a television commercial or in an advertisement placed on the Internet. Also, individual video clips might be incorporated into multimedia software. Television news organizations may more easily share digital video recordings that have been divided up into individual video clips.

Separating digitized video recordings into individual video clips can be a costly process. Initially, separation of digitized recordings into individual video clips was performed manually. An operator of specialized equipment and/or software would manually locate the various transitional markers in the digitized video recording and record the position of those transitional markers.

Techniques have also been developed to automatically identify transitional markers in digitized video recordings using computer hardware, computer software, or a combination of both. Unfortunately, existing techniques use global metrics which focus on each individual video image as a whole to determine image to image (often field to field) similarity. These techniques are not as accurate as is desirable because the use of global metrics neglects the local spatial information contained in a video image. Moreover, some existing techniques make various measurements of the RGB color components of a video image. These techniques are not easily adapted to process both black and white and color video recordings.

SUMMARY OF THE INVENTION

The invention comprises a method and system for detecting transitional markers such as uniform images in a digital video signal made up of a series of video images. The invention employs a technique that segments video images into a series of cells so as to retain spatial information to achieve greater accuracy in predicting transitional events in a video signal. One aspect of the invention is a method for detecting uniform fields. The method comprises segmenting a plurality of the video images into a number of cells, each cell comprising a number of pixels, each pixel associated with an intensity value representing the intensity of the pixel. Then, a plurality of cell contrast vectors each associated with one of the segmented video images is generated. Each element of the cell contrast vector is associated with one of the cells of the video image and comprises the standard deviation of the pixel intensity values for the pixels in that cell. A uniform image is detected for a video image in response to the cell contrast vector associated with that image.

The invention has several important technical advantages. The invention can be used to locate the exact point in the recording at which a transitional event such as a uniform field occurs to allow a viewer of the recording to jump to that point. In other words, the invention allows intelligent random access to the recording. This allows the owner of a video recording to easily index the recording so as to be able to quickly locate the point in time at which each transitional event occurs in the video recording. The invention allows the owner of a video recording to automatically archive the video recording because the invention can accurately identify the location of transitional events and create a list of those locations for archival of video clips. Such automated archival may allow easy random access type retrieval of a specific video clip. Editing of the recording at a later time may be simplified by this feature.

The invention achieves high accuracy in predicting transitional events in video signals as the invention captures a coarse level of spatial information about individual video images in a digital video signal. This information is used in the disclosed method of identifying transitional events. The use of spatial information allows more accurate identification of transitional events and digital recordings. Because the invention uses a coarse level of spatial information, the invention has higher noise immunity than some existing techniques of identifying transitional events.

BRIEF DESCRIPTION OF THE DRAWINGS

For a more complete understanding of the present invention and the advantages thereof, reference is now made to the following descriptions taken in conjunction with the accompanying drawings in which.

DETAILED DESCRIPTION OF THE INVENTION

The preferred embodiment of the present invention and its advantages are best understood by referring to FIGS. 1–8 of the drawings, like numerals being used for like and corresponding parts of the various drawings.

Figure 1:
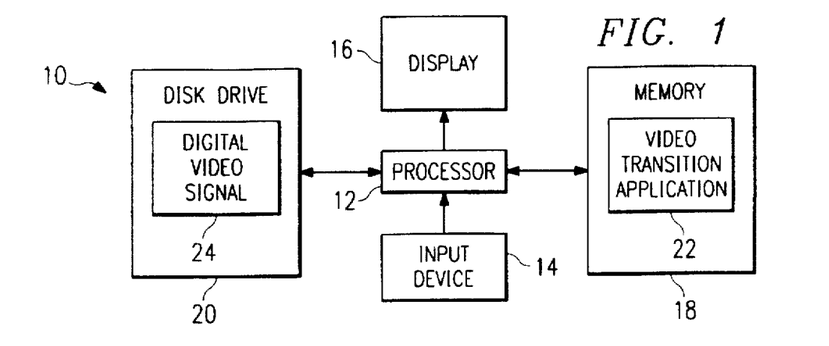
FIG. 1 illustrates a system constructed in accordance with the invention for identifying transitional markers in a digital video signal.

FIG. 1 illustrates a video event detection system 10 that comprises one embodiment of the present invention. In this embodiment, video event detection system 10 comprises computer software running on a general purpose computer known as a Sun SPARC workstation. Video event detection system 10 may be adapted to execute any of the well known MSDOS, PCDOS, OS2, UNIX, Motif, MAC-OS™, X-WINDOWS™, or WINDOWS™ operating systems, or other operating systems. Video event detection system 10 comprises processor 12, input device 14, display 16, memory 18 and disk drive 20. The present invention includes computer software that may be stored in memory 18 or on disk drive 20 and is executed by processor 12. Disk drive 20 may include a variety of types of storage media such as, for example, floppy disk drives, hard disk drives, CD ROM disk drives, or magnetic tape drives. Data may be received from a user of video event detection system 10 using a keyboard or any other type of input device 14. Data may be output to a user of video event detection system 10 through display 16, or any other type of output device.

Video event detection system 10 includes video transition application 22 which is a computer software program. In FIG. 1, video transition application 22 is illustrated as being stored in memory 18 where it can be executed by processor 12. Video transition application 22 may also be stored in disk drives 20. Video transition application 22 processes digital video signals and identifies various transitional events occurring in the digital video signals. In this example, a digital video signal 24 is stored on disk drives 20. Alternatively, video event detection system 10 could receive an analog video signal from an external source, digitize that video signal, and store it on disk drives 20 or in memory 18. A digital video signal could also be received from an external source. The operation of video transition application 22 will now be described in connection with FIGS. 2–8.

Figure 2:
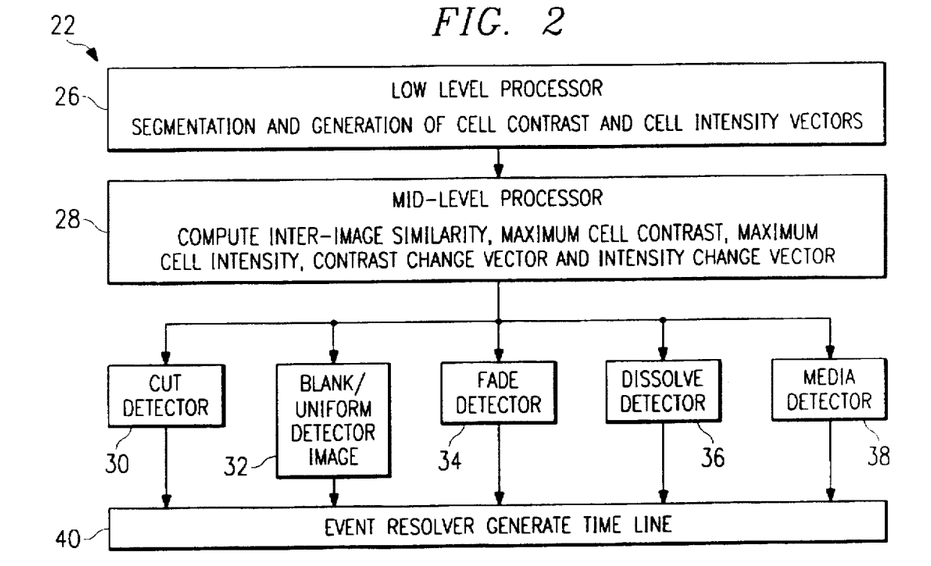
FIG. 2 illustrates an exemplary diagram of the video transition application of FIG. 1.

FIG. 2 illustrates a block diagram of video transition application 22 which is constructed in accordance with the invention. As shown, video transition application 22 comprises low level processor 26, which outputs data to mid-level processor 28. The output of mid-level processor 28 is provided to cut detector 30, blank/uniform image detector 32, fade detector 34, dissolve detector 36, and media detector 38. The output could be provided to other detectors or a subset of these detectors. The outputs of each of the detectors are provided to event resolver 40. In this embodiment, each of these components of video transition application 22 comprise computer software. All or a portion of these functions could also be performed using hardware. In addition, although the functions of video transition application 22 have been divided among several software routines, the structure of video transition application 22 could be changed without departing from the scope of the invention.

Before discussing the operation of each component of video transition application 22, a brief overview of the operation of video transition application 22 is appropriate. Low level processor 26 receives a video signal comprising a series of video images and segments each video image in a digital video signal into a plurality of cells. Each cell includes a number of pixels which are each, in turn, associated with a pixel intensity value. Low level processor 26 generates a cell contrast vector and a cell intensity vector for each segmented video image. The components of the cell intensity vector are each associated with one of the cells of the segmented video image and comprise the average pixel intensity value for pixels in that cell. Each element of the cell contrast vector is associated with one of the cells in the segmented video image and comprises the standard deviation of the pixel intensity values for pixels in that cell. Although each contrast vector element is correlated to the contrast of a particular cell, it is not a measure of the contrast.

Low level processor 26 computes the cell contrast and cell intensity vectors for each segmented video image and passes those vectors to mid-level processor 28. Based upon the cell contrast vector and cell intensity vectors, mid-level processor 28 computes an inter-image similarity value, a maximum cell contrast value, a maximum cell intensity value, a contrast change vector, and an intensity change vector for each segmented video image.

The inter-image similarity value for a particular video image comprises the cosine of the angle between the cell contrast vector for that video image and the cell contrast vector for another video image—in this embodiment, the immediately prior field of the digital video signal. The maximum cell contrast value for a particular video image comprises the largest component of the cell contrast vector for that image. Again, the term contrast refers to a value correlated to the contrast of a particular cell comprising the standard deviation of the pixel intensity values for that cell. Similarly, the maximum cell intensity for a particular image comprises the largest component of the cell intensity vector for that image. The contrast change vector for a particular image comprises the cell contrast vector for that image minus the cell contrast vector for another video image—in this embodiment, the same field in the immediately prior frame of the digital video signal. Similarly, the intensity change vector for a particular video image comprises the difference between the cell intensity vector for that video image and the cell intensity vector for another video image—in this embodiment, the same field in the immediately prior frame of the digital video signal.

After computing these values and vectors, mid-level processor 28 outputs them to cut detector 30, blank/uniform image detector 32, fade detector 34, dissolve detector 36 and media detector 38. Only the values and vectors used by each particular detector are provided to that detector. The operation of each of the detectors 30–38 will be explained more fully in connection with FIGS. 4–8. Each of the detectors 30–38 detects various transitional markers within the digital video signal. When a transitional marker has been detected, the appropriate detector 30–38 generates an event which is passed to event resolver 40. Event resolver 40 processes the transitional markers and generates a timeline annotating the point at which each particular transitional event occurred. In addition, event resolver 40 resolves conflicts between events based upon a priority scheme so as to filter out overlapping events.

The operation of each component of video transition application 22 will now be described in more detail. Low level processor 26 processes a digital video signal. At some prior time, a digital video signal was received by video event detection system 10. Alternatively, a raw video signal may have been acquired through analog-to-digital conversion performed by a video frame grabber. The raw video may be a three channel signal, either red-green-blue (RGB) or luminance-chromanance blue-chrominance red (YCbCr), or a single channel luminance signal. When a luminance signal is not directly available, as in the case of RGB, it is obtained by software calculation. The National Television Systems Committee (NTSC) standard color primary to luminance signal conversion formula may be used to obtain a luminance signal. In accordance with that formula, intensity for a particular pixel equals 0.3 times the red value for that pixel plus 0.59 times the green value for that pixel plus 0.11 times the blue value for that pixel. An intensity (or luminance) value for each pixel is determined for each digitized image (each field in this embodiment) in the digital video signal. Each NTSC video signal comprises a series of frames, each frame further comprising two fields. In this embodiment, then, a video image comprises one field of a digital video signal.

The intensity value for each pixel in a digitized video image in this embodiment lies within the range between 0 and 255 (8-bit resolution). The source luminance signal may be down sampled by dropping values to reduce the scan line pixel count by one-half so as to decrease subsequent image processing times.

Figure 3:
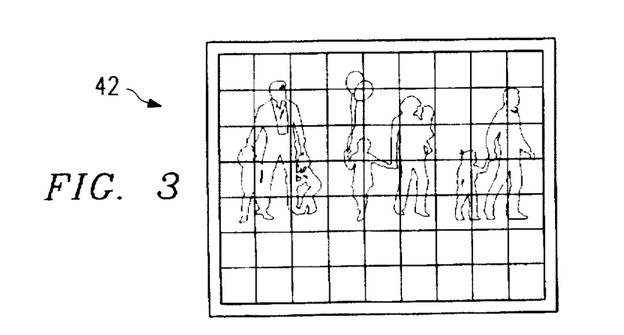
FIG. 3 illustrates the segmentation of a single example video image of the digital video signal.

Low level processor 26 segments each video image (each field in this embodiment) into a number of cells. Each cell comprises a number of pixels. In this embodiment, each video image is divided into 63 cells using a 9×7 grid. FIG. 3 illustrates a segmented video image 42 that has been segmented into 63 cells. Segmenting a video image in this way allows the capture of spatial information about each video image. This spatial information is useful in accurately identifying transitional markers within the digital video signal.

Each digital video image can be segmented into a finer or coarser grid without departing from the teachings of the invention. If the video image is divided too coarsely, spatial information is lost and transitional marker detection may become less accurate. If the video image is segmented more finely, the noise immunity of the invention decreases, which can also affect the accuracy of transitional marker identification. In this embodiment, each video image comprises 320×240 pixels. Each cell of the segmented image comprises a square of 32 pixels by 32 pixels. As illustrated in FIG. 3, an unused 16 pixel horizontal and 8 pixel vertical border appears along each side of the segmented video image 42. These pixels are preferably unused as pixels lying in the border regions may not reliably carry picture content when scanned by video capture devices.

Each segmented video image, then, may be associated with an array of pixel intensity values, $I_k$. This intensity array comprises 320 rows by 240 columns in this embodiment and may be used to generate a cell intensity vector and a cell contrast vector for each video image. In this embodiment, the cell intensity vector for a particular segmented video image has an element for each cell in the segmented video image. Each element is associated with a particular cell of the segmented video image and comprises the mean of the pixel intensity values for each pixel in that cell. The intensity vector, $\mu_k$, can be calculated using Formula (1) where the value p specifies the linear index of a cell's mean intensity value given cell indexes m and n. In this embodiment, the entry p=0 in each feature vector corresponds to the upper lefthand cell of segmented video image 42, and the entry p=62 corresponds to the lower right-hand cell of segmented video image 42.

$$\mu_k[p] = \frac{1}{32^2} \sum_{i=0}^{31} \sum_{j=0}^{31} I_k[32m + 16 + i, 32n + 8 + j]$$

$$m = 0, 1, \ldots, 8 \quad n = 0, 1, \ldots, 6 \quad p = 9n + m \qquad (1)$$

Each element of the cell intensity vector, $\mu_k$, thus provides a measure of a cell's image brightness. Some of the cells could be omitted from the vector or some of the pixels could be omitted from the mean calculation without departing from the scope of the invention. Also, the elements of the cell intensity vector might be proportional to the average of the pixel intensity values for a given cell.

A cell contrast vector, $\sigma_k$, may also be computed for each video image using the array of intensity values, $I_k$. Each element of the cell contrast vector is associated with one of the cells of segmented video image 42 and comprises the standard deviation of the pixel intensity values for each pixel in that cell. The cell contrast vector, $\sigma_k$, may be computed using Formula (2) as follows:

$$\sigma_k[p] = \left( \sum_{i=0}^{31} \sum_{j=0}^{31} (I_k[32m + 16 + i, 32n + 8 + j] - \mu_k[p])^2 \right)^{\frac{1}{2}}$$

$$m = 0, 1, \ldots, 8 \quad n = 0, 1, \ldots, 6 \quad p = 9n + m \qquad (2)$$

where the value p specifies the linear index of a cell's contrast value given cell indexes m and n. Again, entry p=0 in the contrast vector corresponds to the upper lefthand cell of segmented video image 42 and the value p=62 corresponds to the lower right-hand cell of segmented video image 42. Each component of the cell contrast vector is used as a measure of a particular cell's image contrast. As with the cell intensity vector, some of the cells could be omitted from the vector or some of the pixels omitted from the standard deviation calculation without departing from the scope of the invention.

Low level processor 26 outputs the cell contrast vector and cell intensity vector for each segmented video image to mid-level processor 28. Mid-level processor 28 then computes five time domain values as functions of the cell contrast vector and cell intensity vector for each video image. Collectively, these values form five time domain signals. These time domain signals comprise three scalar values and two vector values. The scalar values include the inter-image similarity value, maximum cell contrast value, and maximum cell intensity value. The vector values include the contrast change vector and intensity change vector. Other values could be computed without departing from the scope of the invention.

The maximum cell intensity value, $B_k$, for image number k comprises the largest element of the cell intensity vector for image number k and can be computed using the following formula:

$$B_k = \max\{\mu_k[p] | p = 0, 1, \ldots, 62\} k=0, 1, \ldots, N-1 \quad (3)$$

The maximum cell contrast value, $C_k$, for image number k comprises the largest element of the cell contrast vector for that image and can be computed using the following formula:

$$C_k = \max\{\sigma_k[p] | p = 0, 1, \ldots, 62\} k=0, 1, \ldots, N-1 \quad (4)$$

The inter-image similarity value, $S_k$, for image number k represents the cosine of the angle between the cell contrast vectors for adjacent video images (adjacent fields in this embodiment). An angular distance measure was selected to compare similarity between images because angular distance is more tolerant of overall scene brightness changes than Euclidean distance measures. For example, if an actor causes a sudden change in scene brightness such as by turning a light on in a room during a scene in the video, a Euclidean distance measure may cause an erroneous transitional marker detection. The angular measure represented by the inter-image similarity value, $S_k$, will function properly in such a situation and reduces the number of false transitional marker detections. Inter-image similarity value, $S_k$, can be computed using the following formula:

$$S_k = \begin{cases} \dfrac{(\sigma_k \cdot \sigma_{k-1})}{(|\sigma_k||\sigma_{k-1}|)} & k = 2, 3, \ldots, N-1 \\ 1 & k = 0, 1 \end{cases} \quad (5)$$

Mid-level processor 28 also computes two vector values—the intensity change vector and contrast change vector. The intensity change vector is used to measure individual cell intensity changes while the contrast change vector is used to measure individual cell contrast changes. In this embodiment, these changes are measured by cell differences between fields of the same polarity (even or odd) in adjacent frames. The intensity change vector, $b_k$, for image k can be computed using the following formula:

$$b_k[p] = \begin{cases} \mu_k[p] - \mu_{k-2}[p] & k = 2, \ldots, N-1 \\ 0 & k = 0, 1 \end{cases} \quad (6)$$

$$p = 0, 1, \ldots, 62$$

The contrast change vector, $c_k$, for image k can be calculated using the following formula:

$$c_k[p] = \begin{cases} \sigma_k[p] - \sigma_{k-2}[p] & k = 2, \ldots, N-1 \\ 0 & k = 0, 1 \end{cases} \quad (7)$$

$$p = 0, 1, \ldots, 62$$

The outputs of mid-level processor 28 are provided to each of the detectors 30–38. The scalar and vector values computed by mid-level processor 28 for each individual video image can be combined to form time domain signals. The detectors 30–38 may then filter such signals to aid in detecting transitional markers in the video signal. In this embodiment, these mid-level signals reflect a sampling rate of 59.94 Hz, the standard NTSC field broadcast rate. This sampling rate is used to measure event duration when developing event models for each detector. If the sampling rate changes, modification should also be made to the event detection models.

The operation of each of the detectors 30–38 will now be described in connection with FIGS. 4–8. Each of the detectors 30–38 comprises a software process but could also comprise specialized hardware.

Figure 4:
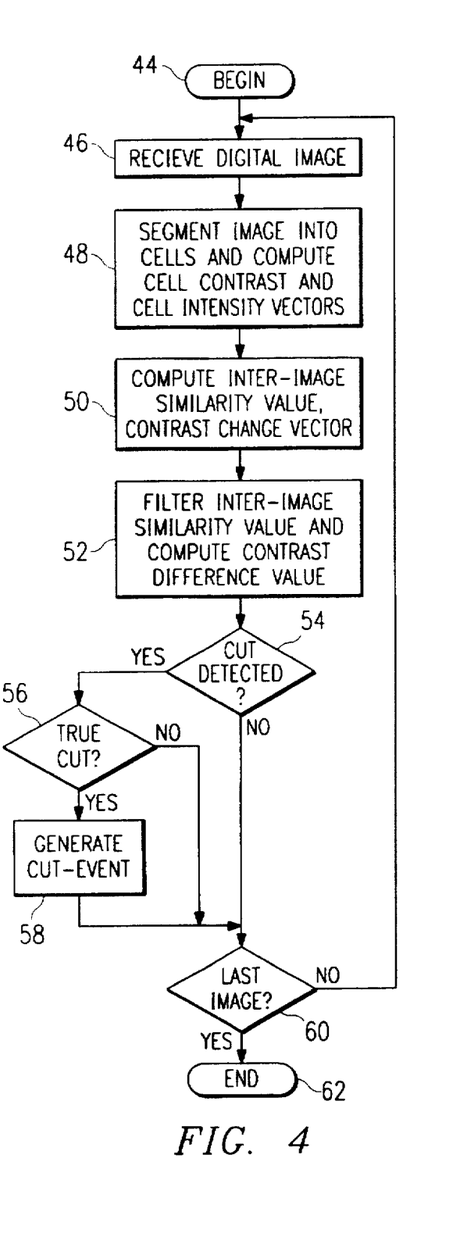
FIG. 4 illustrates a flow chart of a method of detecting cuts in a digital video signal in accordance with the invention.

FIG. 4 illustrates a method of detecting a cut in a digital video signal. This method is performed by cut detector 30 in video transition application 22. A cut is an abrupt transition from one camera shot to another. In a digitized NTSC video signal, this transition is seen as a significant change in the picture from field to field—for example, from field k−1 to field k. Its characteristic appearance to the viewer is a quick spatiotemporal change of scene or camera position. Cuts often occur during a change from one scene to another and during shifts between different camera angles within a scene.

The method of FIG. 4 begins at step 44 with initialization and whatever preparation of the video signal is required. At the conclusion of step 44, the process is prepared to operate on a digital video signal. In step 46, a video image (in this embodiment, a field of an NTSC video signal) of a digital video signal is received by low level processor 26. Next, in step 48, low level processor 26 segments the video image into cells and computes the cell contrast and cell intensity vectors as described above. The cell contrast and cell intensity vectors are passed as outputs to mid-level processor 28. Then, in step 50, mid-level processor 28 computes the inter-image similarity value and contrast change vector for the video image, as described above. These values are output to cut detector 30.

In step 52, cut detector 30 analyzes the inter-image similarity signal formed by the series of inter-image similarity values for a series of video images to identify characteristic spikes induced in this signal by a cut in the digital video signal. A spike filter is applied to the inter-image similarity signal in order to isolate spikes of a width no greater than two video images (two fields in this embodiment). The sensitivity of the spike filter in terms of the width of the spikes isolated may vary depending upon the capture frame rate and/or the scan method of the video signal. The spike filter helps to prevent false cut detection due to motion in the video signal. The implemented spike filter preferably operates over a −10 to +10 video image window centered about the video image under consideration. Each video image is a field of an NTSC signal in this embodiment. The filtered spike size, g[k] for video image k is defined by the following formulas:

$$G_k = \min\{S[k - m] | m = 1, \pm2, \pm3, \ldots, \pm10\} \quad (8)$$

$$g[k] = \begin{cases} G_k - S[k] & S[k] < G_k \\ 0 & \text{otherwise} \end{cases} \quad (9)$$

$$\text{for } k = 0, 1, \ldots, N-1$$

where g[k] represents the distance that a given spike extends below the minimum similarity value of a neighboring video image from within the filtering window.

Continuing in step 52, cut detector 30 also processes the contrast change vector to generate a contrast difference value for a particular video image. The contrast difference value, Gc, comprises a count of all elements of the contrast change vector associated with that video image that are greater than a first contrast change value or less than a second contrast change value. In this embodiment, Gc indicates the count of cells having an inter-image contrast difference of a magnitude greater than or equal to three units of the standard deviation measure. Contrast differences meeting or exceeding this value are considered to be produced by cuts. The contrast difference value, Gc, for video image k can be calculated using the following formulas:

$$\chi[p] = \begin{cases} 1 & -3.0 < c_k[p] < 3.0 \\ 0 & \text{otherwise} \end{cases} \quad (10)$$

-continued for $p = 0, 1, \ldots, 62$ $$Gc[k] = 63 - \sum_p \chi[p] \qquad (11)$$

Next, in step 54, cut detector 30 determines whether a cut has been detected for the video image under consideration. Cut detector 30 employs three independent tests to determine whether a cut has been detected. First, if the filtered spike size value, g[k], for video image k exceeds a threshold value (0.045 in this embodiment) and the ratio of the filtered spike size value, g[k], to the difference between one and the inter-image similarity value, $S_k$, exceeds a second threshold (0.6 in this embodiment) then a small spike cut event centered at video image k is detected. Second, if the filtered spike size value, g[k], for video image k exceeds another threshold (0.13 in this embodiment), then a large spike cut event centered at video image k is detected. Third, if the contrast difference value, Gc[k], for video image k exceeds another threshold (45 in this embodiment) and the difference between the contrast difference value for video image k and the maximum of the contrast difference values for a plurality of other video images in the neighborhood of video image k (in this embodiment—Gc[k−1] and Gc[k+1]) exceeds another threshold (7 in this embodiment), then a cut event centered at video image k is detected. Any one of these occurrences may cause a cut to be detected in step 54. Other methods of detecting cuts can be used without departing from the scope of the invention.

This method may in some instances detect a cut where no cut exists. Thus, an error check is applied in step 56 to determine whether a true cut has been detected. When a cut is detected, cut detector 30 determines whether the contrast difference value, Gc, for a particular image exceeds a threshold (25 in this embodiment). If this test is met, a cut is recognized and cut detector 30 generates an event in step 58 indicating that a cut has been detected in the digital video signal at video image k. Then, in step 60, if video image k is not the last image in the digital video signal, the process begins again at step 46. Otherwise, the procedure terminates in step 62. If no cut was detected in step 54 or if the error checking function revealed an erroneous cut detection in step 56, then the method proceeds to step 60 from either of steps 54, 56. The error checking step 56 could be omitted without departing from the scope of the invention.

Although the illustrated embodiment utilizes the interimage similarity value defined above based upon the cell contrast vector, a similar method could be used to detect cuts using an interimage similarity value based upon the cell intensity vector. In this alternative embodiment, the interimage similarity value comprises the cosine of the angle between the cell intensity vector for the current image and the cell intensity vector for a prior image. Although different thresholds may be used for cut detection with this similarity value, the remaining steps of the method can be applied to detect cuts based upon the cell intensity vectors.

Figure 5:
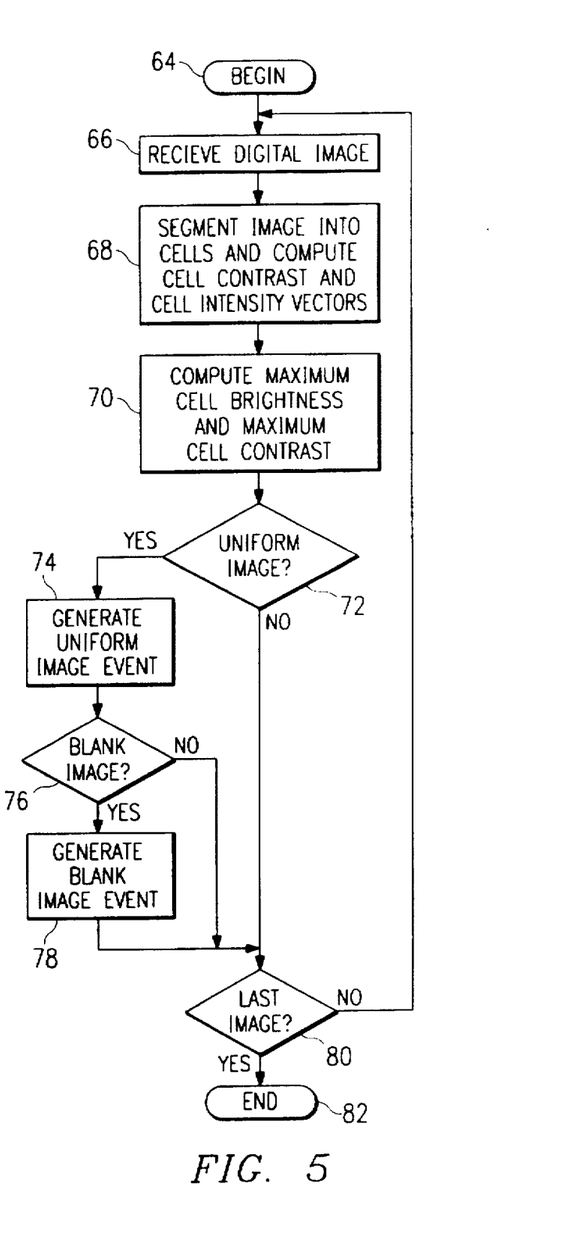
FIG. 5 illustrates a flow chart of a method for detecting blank and/or uniform video images in a digital video signal in accordance with the invention.

FIG. 5 illustrates a method for detecting blank and/or uniform images in a digital video signal in accordance with the invention. This method is performed by blank/uniform image detector 32 in video transition application 22. A uniform image has a single tone or color appearing as a background. Uniform images are commonly found within program introductions and credits and within commercials. They often serve as a background for stationary and scrolled text. Within commercials, fade-to-white and fade-from-white image transition sequences employ uniform white images. A blank image is a special case of a uniform image and comprises an all black image. Normally, blanking is part of a visual transition sequence where blank images are inserted between cut and/or fade transitions. Blank images are also used when a pause is required to inform the viewer of a change of context, such as between commercials, or to mark a major change in location or time. When blanking is used to separate commercial and program segments, experimental data indicates that blanking times may vary significantly between one and eighty or more fields. When blanking is used within a program or commercial segment, experimentally obtained blanking times are more consistent, normally ranging between four and sixteen fields.

The procedure begins in step 64 with initialization and whatever preparation of the video signal is required. At the conclusion of step 64, a digital video signal is ready to be processed by video transition application 22. In step 66, a video image is received by low-level processor 26. Next, in step 68, low level processor 26 segments the video image into cells and computes the cell contrast and cell intensity vectors as described above. Low level processor 26 outputs these vectors to mid-level processor 28. Then, in step 70, mid-level processor 28 computes the maximum cell intensity and maximum cell contrast values for the video image. Mid-level processor 28 then outputs these values to blank/uniform image detector 32.

In step 72, blank/uniform image detector 32 determines whether the video image is a uniform image. It does so by comparing the maximum cell contrast value to a threshold value (5.0 in this embodiment). If the maximum cell contrast is below the threshold, then a uniform image is detected and a uniform image event is generated in step 74. Then, in step 76, blank/uniform image detector 32 compares the maximum cell intensity to a second threshold (35 in this embodiment) and the maximum cell contrast to a third threshold (4.0 in this embodiment) and if both the maximum cell intensity and maximum cell contrast for the image under consideration are less than their respective thresholds, then a blank image is detected and a blank image event is generated in step 78. In an alternative embodiment, a blank image could be detected by comparing only the maximum cell intensity to a threshold. Following step 78, it is determined in step 80 whether the image under consideration was the last image or not. If so, then the procedure terminates at step 82. If not, then the procedure processes the next digital image by returning to step 66. If a uniform image was not detected in step 72 or if a blank image was not detected in step 76, execution proceeds to step 80. The thresholds used in this embodiment may depend on the digitizer used to digitize the video signal and should be experimentally determined.

Figure 6:
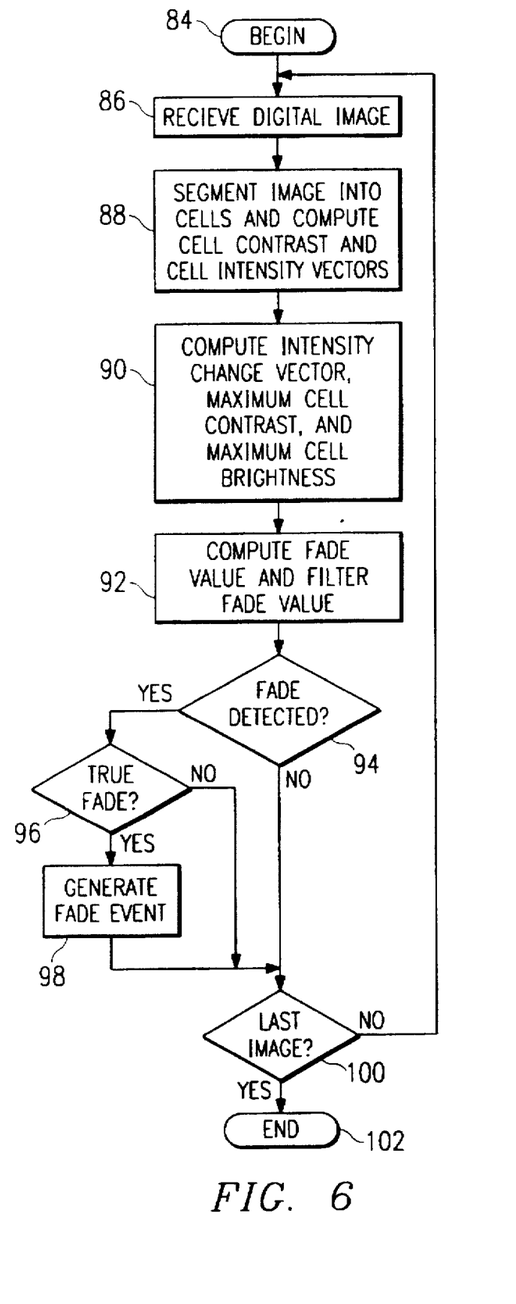
FIG. 6 illustrates a flow chart of a method for detecting fade transitions in a digital video signal in accordance with the invention.

FIG. 6 illustrates a method for detecting fades in a digital video signal in accordance with the invention. Fade detector 34 of video transition application 22 may detect fades in a video signal using the method disclosed in FIG. 6. A fade-out transition moves the viewer of a video from a scene and camera shot to a uniform target image. Normally, the target image is a blank or a black field, but in some instances, the target image may be white. The fade-in, opposite in effect from the fade-out, moves the viewer from a uniform black or white image to a new scene. A time-weighted average of the uniform image and the departing or arriving scene is used to generate fades.

The duration of fade transitions is widely variable. Transition data experimentally obtained included fades with lengths between eight and fifty fields with a modal value of eighteen and median value of twenty fields. Other data included fades as long as 200 fields.

Fade-out and fade-in transitions are often used in combination, forming a transition sequence separating one scene from another. The new scene will often describe action in a different location, at a different time, or of a different nature. In network broadcast programming, fade-to-black transition sequences occur most frequently at the beginning and ending of program and commercial segments. Fade-to-white and fade-from-white sequences are normally used only within a program segment or within a commercial spot.

The method begins in step 84 with initialization and whatever preparation of the video signal is required. At the conclusion of step 84, video transition application 22 is ready to process a digital video signal. In step 86, a video image is received by low level processor 26. Then, in step 88, low level processor 26 segments the image into cells and computes the cell contrast and cell intensity vectors as described above. Low level processor 26 outputs the cell contrast and cell intensity vectors to mid-level processor 28. In step 90, mid-level processor 28 computes the intensity change vector, maximum cell contrast value, and maximum cell intensity value for the video image. These values are output to fade detector 34.

Next, in step 92, fade detector 34 generates a fade value for the video image being processed. Collectively, the fade values for a series of video images create a fade signal. The fade value, F[k], for a video image comprises the difference between the total number of elements of the intensity change vector, $b_k$, for the video image that have a value between a first lower limit and a first upper limit and the total number of elements of the intensity change vector, $b_k$, for the video image that have a value between a second lower limit and a second upper limit. This is a histogram-type measure and uses histogram $Hb_k$. Histogram intervals of 0.3 units are used in this embodiment. It has been determined experimentally that fade events produce brightness differences detectable by this interval size. Smaller intervals are overly sensitive to noise in the video signal. The brightness difference histogram, $Hb_k$, can be computed using the following formulas:

$$\chi[m, p] = \begin{cases} 1 & 0.3(m-18) \leq b_k[p] < 0.3(m-17) \\ 0 & \text{otherwise} \end{cases} \quad (12)$$

$$m = 0, 1, \ldots, 35 \quad p = 0, 1, \ldots, 62$$

$$Hb_k[m] = \sum_p \chi[m, p] \quad (13)$$

The fade value, F[k], for image k in this embodiment comprises the total of the histogram cells between 0.3 and 5.4 units minus the total of the histogram cells between −5.4 and −0.3. Differences within this range reflect a gradual decrease or increase in the overall cell brightness. Differences outside of this range were experimentally found to be too large to be produced by fades. Other ranges could be chosen without departing from the scope of the invention, however. The fade value, F[k], for image k can be computed using the following formula:

$$F[k] = \sum_{i=19}^{35} Hb_k[i] - \sum_{i=0}^{16} Hb_k[i] \quad (14)$$

Continuing with step 92, after the fade value, F[k], has been computed for a video image, then the fade signal formed by the fade values is filtered to produce a filtered fade signal. The filtered fade signal comprises a plurality of filtered fade values wherein each filtered fade value is associated with a particular video image. A Gaussian filter with $\mu=k$, $\sigma=10$, is applied to the absolute value of the fade signal, averaging totals over a 60 image ($-3\sigma$ to $+3\sigma$) window centered about image k. Other filter types and sizes could be used without departing from the scope of the invention. The filtered fade value, f[k], for a particular image k can be computed using the following formula:

$$f[k] = \sum_{l=-30}^{30} |F[k-l]| \frac{1}{\sqrt{2\pi} \, 10} e^{-(l-k)^2/10^2} \quad (15)$$

After the filtered fade value, f[k], has been calculated for a video image, the process continues in step 94 where it is determined whether a fade has been detected. A fade is detected for a particular video image k if the filtered fade value for that image, f[k], exceeds a threshold value (15 in this embodiment). This embodiment of the invention, however, will indicate fades only where image k comprises the center of a fade. The fade center is defined as the point where the fade value for image k, f[k], exceeds the threshold value and where f[k]>f[k+1]. If the center of a fade is detected, then it is determined in step 96 whether or not the fade event is truly a fade event. Fade detector 34 determines whether the fade event is truly a fade event for image k by determining the sign of the fade value, F[k], for that image and by examining the maximum cell intensity and maximum cell contrast within a neighborhood of image k. This process also identifies the type of fade detected as described in Table 1.

TABLE 1

| Fade Type Codes as Derived from Signal Values | | | |
|---|---|---|---|
| F[k]>0 | $B_{k-30}$<40 | $C_{k+30}$>5 | FADE_IN (from black) |
| F[k]>0 | $B_{k-30}$>=40 | $C_{k+30}$<=5 | FADE_OUT (to white) |
| F[k]<0 | $B_{k+30}$>=40 | $C_{k-30}$<=5 | FADE_IN (from white) |
| F[k]<0 | $B_{k+30}$<40 | $C_{k-30}$>5 | FADE_OUT (to black) |

As described in Table 1, if the fade value for image k is positive, the maximum cell intensity within a neighborhood of image k and image k−30 is less than a threshold (40 in this embodiment) and the maximum cell contrast within a neighborhood of image k and image k+30 is greater than a threshold (5 in this embodiment) then a fade-in from black is detected. Similarly, with a positive fade value for image k, a maximum cell intensity greater than a threshold in a negative neighborhood about image k, and a maximum cell contrast less than a threshold in a positive neighborhood about image k, a fade-out to white is detected. Different size neighborhoods or thresholds could be used without departing from the scope of the invention. For a fade value for image k that is negative, a fade-in from white is detected where the maximum cell intensity within a positive neighborhood about image k exceeds a threshold and where the cell contrast for a negative neighborhood about image k is less than a threshold. Finally, a fade-out to black is detected where the fade value for image k is negative, the maximum cell intensity in a positive neighborhood about image k is less than a threshold and the maximum cell contrast in a negative neighborhood about image k exceeds a threshold. If none of these types of fades are detected, then it is determined that a true fade does not exist and the method proceeds to step 100 where it is determined whether the current image is the last image in the digital video signal. If so, the procedure terminates in step 102. If not, then the next digital image is processed beginning with step 86.

Returning to step 96, if a true fade was detected, then in step 98, a fade event indicating the type of fade (in or out, and black or white) is generated. The procedure then continues at step 100 as discussed above. Similarly, if no fade was detected in step 94, the procedure continues in step 100.

Alternatively, step 96 could be omitted and the type of fade could simply be determined in step 98. If this option is chosen, then for image k and a fade value greater than zero, a fade-in from black would be indicated where the maximum cell contrast in a negative neighborhood about image k is less than a threshold and a fade-out to white would be indicated where the maximum cell contrast in a positive neighborhood about image k is less than a threshold. Similarly, where the fade value for image k is less than zero, a fade-in from white event would be indicated where the maximum cell contrast in a negative neighborhood about image k is less than a threshold and a fade-out to black would be indicated where the maximum cell contrast in a positive neighborhood about image k was less than a threshold.

Any of the thresholds and ranges for the neighborhoods can be changed without departing from the scope of the invention. Various other methods of detecting false fades could also be used without departing from the scope of the invention.

Figure 7:
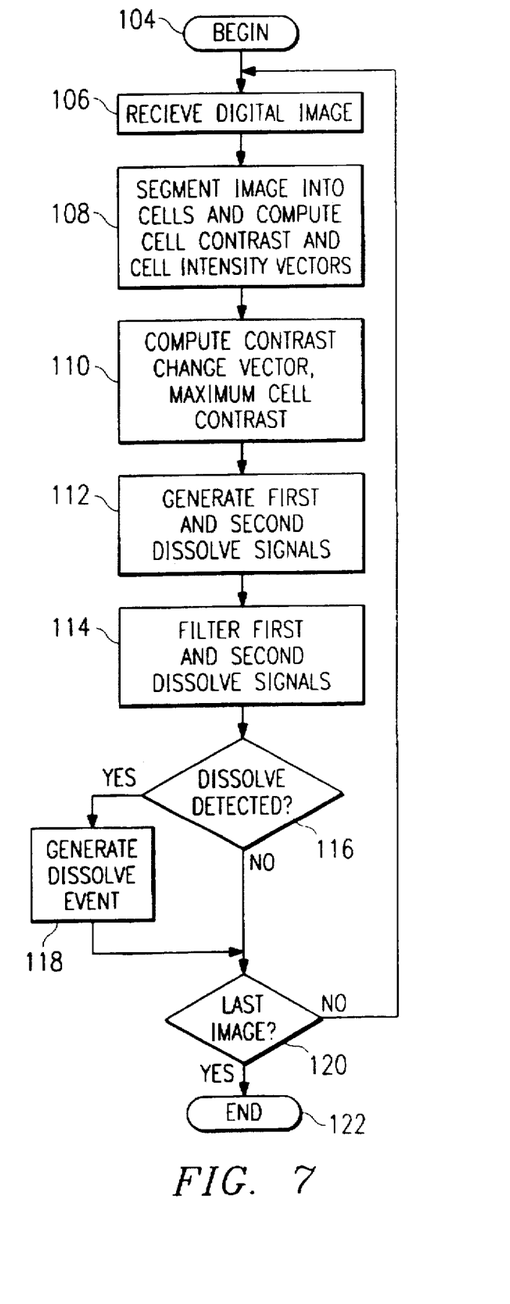
FIG. 7 illustrates a flow chart of a method for detecting dissolve transitions in a digital video signal in accordance with the invention.

FIG. 7 illustrates a method of detecting dissolve transitions in a digital video signal in accordance with the invention. Dissolve detector 36 of video transition application 22 may use this method to detect dissolve transitions. Dissolve transitions move the viewer of a video signal between two camera shots, A and B, by averaging them over time. A weighted average is used which gradually reduces the intensity of shot A, and increases that of B. Experimentally determined transition data included dissolves with lengths ranging from ten to one hundred two fields of an NTSC video signal with a modal value of sixteen and a median value of eighteen fields. Other samples had dissolves as long as one hundred eighty fields.

The method begins in step 104 with initialization and whatever preparation of the video signal is required. At the end of step 104, a video signal is ready to be processed by video transition application 22. In step 106, a video image is received by low level processor 26. Then, in step 108, low level processor 26 segments the video image into cells and computes the cell contrast and cell intensity vectors as described above. The cell contrast and cell intensity vectors are output to mid-level processor 28. In step 110, mid-level processor 28 computes a contrast change vector and maximum cell contrast value for the video image. These are output to dissolve detector 36.

In step 112, a first dissolve signal and a second dissolve signal are generated. The first dissolve signal comprises a series of first dissolve values each associated with a video image while the second dissolve signal comprises a series of second dissolve values, each associated with a video image. The first dissolve signal is used to measure fast dissolves (those dissolves taking from 16 to 60 fields to complete) while the second dissolve signal is used to measure slow dissolves (those dissolves taking between 60 and 180 fields to complete). The first and second dissolve values for a video image are computed using a contrast difference histogram, $Hc_k$. Histogram intervals of 0.5 units are used in this embodiment. Experimentally recorded dissolve transitions were found to produce contrast differences detectable by this interval size. Other interval sizes could be used without departing from the scope of the invention. Contrast difference histogram, $Hc_k$, can be computed using the following formulas:

$$\chi[m, p] = \begin{cases} 1 & 0.5(m-18) \leq c_k[p] < 0.5(m-17) \\ 0 & \text{otherwise} \end{cases} \quad (16)$$

$$m = 0, 1, \ldots, 35 \quad p = 0, 1, \ldots, 62$$

$$Hc_k[m] = \sum_p \chi[m, p] \quad (17)$$

$$\beta_k = 1 + \frac{\min[\max(50.0 - C_K, 0.0), 40.0]}{40.0} \quad (18)$$

The first and second dissolve values are generated by multiplying the contrast difference histogram, $Hc_k$, within a limited frequency range of cell contrast differences times $\beta_k$, a gain value. $\beta_k$ is a gain value which tends to increase dissolve values in response to lower contrast maximums. First dissolve value, D1[k] and second dissolve value D2[k], for image k can be calculated using the following formulas:

$$D2[k] = \left( \sum_{i=19}^{23} Hc_k[i] + \sum_{i=12}^{16} Hc_k[i] \right) \beta_k \quad (19)$$

$$D1[k] = \left( \sum_{i=19}^{33} Hc_k[i] + \sum_{i=2}^{16} Hc_k[i] \right) \beta_k \quad (20)$$

Other gain values could also be used in formulas 19 and 20.

Next, in step 114, the first and second dissolve signals, comprised of the series of first and second dissolve values, are filtered to produce a first filtered dissolve signal and second filtered dissolve signal, each comprising a plurality of filtered values each associated with a specific video image. Filtering of the first and second dissolve signals is accomplished by convolving each signal with a specific difference of Gaussian function. A difference of Gaussians is used to avoid detecting a dissolve where a camera is panning in a scene or where a scene has low contrast for a long period of time. Filter window sizes of 120 and 240 video images are used in this embodiment. Filter window sizes may vary depending upon the video frame rate and/or the signal scanning method. The first filtered value, d1[k] and second filtered value, d2[k], for video image k can be calculated using the following formulas:

$$d1[k] = \sum_{l=-60}^{60} D1[k-l] \left( \frac{1}{\sqrt{2\pi} \ 20} e^{-(l-k)^2/2 \cdot 20^2} - \frac{1}{\sqrt{2\pi} \ 40} e^{-(l-k)^2/40^2} \right) \quad (21)$$

$$d2[k] = \sum_{l=-120}^{120} D2[k-l] \left( \frac{1}{\sqrt{2\pi} \ 40} e^{-(l-k)^2/40^2} - \frac{1}{\sqrt{2\pi} \ 80} e^{-(l-k)^2/80^2} \right) \quad (22)$$

It is then determined in step 116 whether a dissolve has been detected or not. A fast dissolve is detected when the first dissolve signal is greater than a first threshold value (22 in this embodiment). Dissolve detector 36 only generates a dissolve event, however, when the center of the dissolve is reached. The center of a fast dissolve is the position at which the first filtered value for that image is greater than the threshold and the first filtered value for image k exceeds the first filtered value for image k+1. Similarly, a slow dissolve centered at image k is detected where the second filtered value is greater than a threshold (17 in this embodiment) and the second filtered value for image k is greater than the second filtered value for image k+1. If either type of dissolve is detected, then an appropriate dissolve event is generated at step 118. If no dissolve was detected in step 116, the process continues in step 120 where it is determined whether the video image being processed is the last image. If not, then the next image is processed starting at step 106. If so, then the procedure terminates at step 122.

Figure 8:
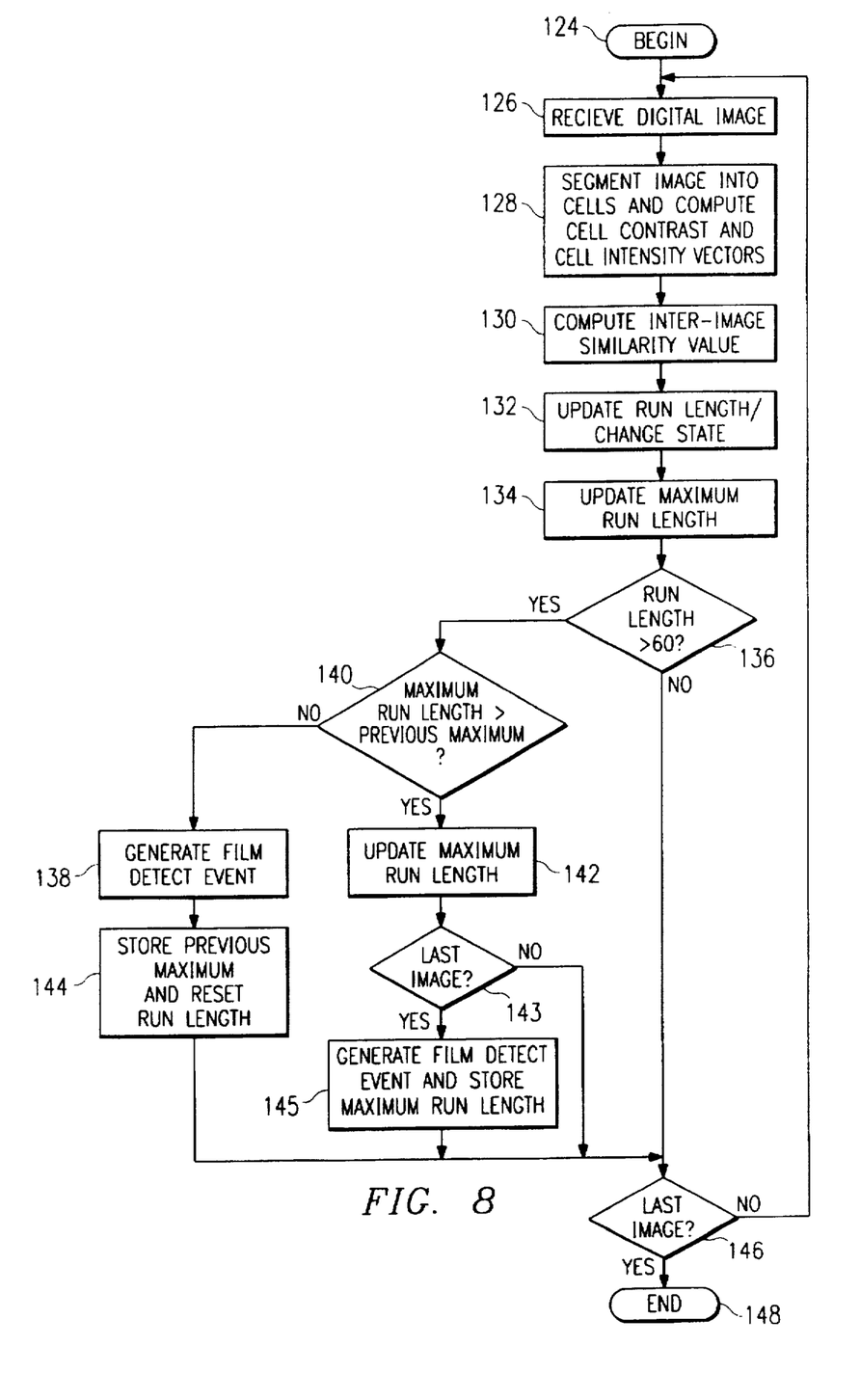
FIG. 8 illustrates a flow chart of a method for detecting the type of production media used to create a digital video signal in accordance with the invention.

FIG. 8 illustrates a method for detecting the type of production media used to produce a digital video signal in accordance with the invention. Media detector 38 of video transition application 22 may use this method to identify the type of production media used for a particular video signal. A useful index for broadcast video is an identification of the original production media. Specifically, one might desire to know whether the original production was videotaped or whether it was filmed. An NTSC broadcast signal that was videotaped has a sixty field per second (thirty frame per second) rate. However, cartoons may have a twelve or twenty-four frame per second rate while a film normally has a twenty-four frame per second rate. To translate a cartoon or a film into an NTSC broadcast signal, some frames are repeated. For a twenty-four frame per second film, the frames are sent in a 3-2 field presentation wherein a first frame of the film is broadcast during the first three fields of an NTSC broadcast signal and the second frame of the film is broadcast during the fourth and fifth fields of the NTSC broadcast signal. This 3-2 pattern continues for each frame in the film. For a cartoon with a twelve frame per second rate, each frame is broadcast during five consecutive fields of an NTSC broadcast signal.

Media detector 38 of video transition application 22 identifies each video clip within a digital video signal as having been recorded either on film or on videotape. Media detector 38 employs a set of five finite-state machines whose outputs are combined to determine the presence and length of a twenty-four frame per second or twelve frame per second segment. More or less state machines could be used. Each finite-state machine is designed to synchronize to a twenty-four frame per second signal with a specific phase. These state machines will also synchronize with a twelve frame per second signal with a specific phase. Because the 3-2 field presentation rate of a twenty-four frame per second film is fixed and periodic, it can be represented by a square wave with a period five fields long. The leading edge of this waveform with respect to the start of the clip is considered to be its phase. Individual finite-state machines process the digital video signal to detect the leading and trailing edges of frame changes and compare these positions to those matching their internal hard-coded phase pattern. A count of images matching the pattern is maintained and recorded by each state machine.

Each state machine is a five-state automaton, counting images in the video stream that match its phase configuration. The phase of each state machine is said to match a given phase pattern as long as frame-to-frame changes occur at the appropriate image positions. While matching is successful, the finite-state machines' output count is increased. When a match fails, the finite-state machine resets this count to zero.

The process begins in step 124 with initialization and whatever preparation of the video signal is required. At the end of step 124, a digital video signal is ready to be processed by video transition application 22. In step 126, a video image is received by low level processor 26. In step 128, low level processor 26 segments the image into cells and computes the cell contrast and cell intensity vectors for the image. These vectors are output to mid-level processor 28. Mid-level processor 28, in step 130, computes the inter-image similarity value, as discussed above. This value is output to media detector 38.

In step 132, the run length for each of the five finite-state machines is updated in accordance with Table 2. The state of each finite-state machine is also changed in accordance with Table 2.

TABLE 2

| Present State | Next State | Next Count Output m= |
|---|---|---|
| A | B | m+1 |
| B | C | if S>$T_{new}$,m+1 else 0 |
| C | D | if S>$T_{new}$,m+1 else 0 |
| D | E | m+1 |
| E | A | if S>$T_{new}$,m+1 else 0 |

As described in Table 2, a threshold value (0.993 in this embodiment) is used to determine whether an image k is different from image k–1. When the inter-image similarity value $S_k$ is less than the threshold value, it is determined that a new image is present and a leading or trailing edge has been found. Otherwise, the previous image, or one virtually identical to it, is present and no edge is detected.

In step 134, the maximum run length is updated. A combiner in media detector 38 compares the output counts of all five finite-state machines after the processing of each image and selects the maximum value as the current twenty-four frame per second run length. The combiner terminates a run as soon as the current run length is smaller than the previous run length. The previous run length is reported as the number of images found in the twenty-four frame per second video clip.

In step 136, it is determined whether the maximum run length has exceeded 60 video images (60 fields in this embodiment). A minimum run length of 60 video images causes media detector 38 to identify a particular video clip as a twenty-four frame per second clip. Another run length threshold could also be used. Video segments not identified as twenty-four frame per second clips are, by default, assumed to be thirty frame per second clips. Video clips that are twelve frame per second cartoons will be detected as twenty-four frame per second clips in this embodiment. Alternatively, an additional state machine or state machines could be used to differentiate between twenty-four frame per second filmed video clips and twelve frame per second cartoon video clips.

If the maximum run length did not exceed 60 in step 136, then it is determined in step 146 whether the image being processed is the last image in the video signal. If not, then the next image is processed beginning with step 126. If so, then the procedure terminates in step 148.

If the maximum run length was greater than 60 in step 136, then it is determined whether the maximum run length is greater than the previous maximum run length in step 140. If so, then the maximum run length is updated in step 142. If not, then a film detect event is generated in step 138 with the previous maximum run length stored as the run length for the event. In step 144, the run length counters are reset. If the maximum run length was updated in step 142, then a check is made in step 143 to determine whether the current image is the last image. If so, then a film detect event is generated in step 145 with the maximum run length counter stored as the run length.

Media detector 38 also generates an event in step 144 for event resolver 40. This event identifies the number of the image where a twenty-four frame per second clip began as well as the run length of that clip.

Returning to FIG. 2, when any of the transitional markers are detected by one of the detectors 30–38, the events generated by the detectors 30–38 are sent to event resolver 40. Event resolver 40 resolves multiple and overlapping events and generates a timeline identifying the transitional markers encountered within a particular digital video signal.

Because the detectors 30–38 operate independently, it is possible for multiple or overlapping events to be indicated. For example, dissolve detector 36 can be triggered by fades of certain durations or by a cut to blanking. Also, dissolves whose length is in between the slow and fast averaging window can cause both events to be placed in the event stream if they are centered on different image numbers. Fast fades in the video signal can cause a cut event to be detected between the last faded image and the following blank field. Event resolver 40 removes ambiguities caused by these and other similar conditions.

Event resolver 40 chooses which event to report when multiple, overlapping, or conflicting events are indicated. The technique used by event resolver 40 is to choose an event based upon a predetermined preferred event priority and a minimum separation distance required of each event. Event priorities, from highest to lowest, and their required spacing are listed in Table 3. Minimum separation distances, measured in image counts (field counts in this embodiment) were experientially determined by examining event lengths and inter-event gaps found in sample broadcast video signals.

video transition application 22 is a software application, all or a portion of the functions performed by video transition application 22 could be performed in hardware. Also, although the present embodiment processes NTSC broadcast video signals comprising a series of frames each comprised of two fields, the invention could be used for any type of video signal.

This embodiment of video transition application 22 performs segmentation on each field of an NTSC broadcast video signal. Alternatively, the methods of the invention could be used by segmenting only every other field, every other frame, etc. of the NTSC broadcast video image. Similarly, even if all fields or all frames are segmented, the various image features such as the cell contrast and intensity vectors might only be computed for a subset of the segmented video images. Also, a subset of the pixels within each cell might be used to compute the cell contrast and cell intensity values for that cell. Similarly, a subset of the cell intensity and cell contrast values for a video image might be used to form the cell contrast and cell intensity vectors. Certain thresholds were described herein. These thresholds could all vary from the thresholds described without departing from the scope of the invention. Other substitutions are also possible and can be made without departing from the spirit and scope of the invention as defined by the appended claims.

What is claimed is:

1. A method of detecting a uniform image in a digital video signal made up of a series of video images, comprising:

TABLE 3

Event Priorities and Minimum Separation Distances

| Event Type | Priority | Minimum Event Separation Distance (in fields) | | | | | |
|---|---|---|---|---|---|---|---|
| | | blnk | unif | fadi | fado | cut | dfst | dslw |
| BLANK_FIELD | 1 | 1 | 1 | 8 | 8 | 15 | 50 | 100 |
| UNIFORM_FIELD | 2 | * | 1 | 8 | 8 | 15 | 50 | 100 |
| FADE_IN | 3 | * | * | 30 | 30 | 30 | 65 | 115 |
| FADE_OUT | 3 | * | * | 30 | 30 | 30 | 65 | 115 |
| CUT | 4 | * | * | * | * | 10 | 50 | 100 |
| DISSOLVE_FAST | 5 | * | * | * | * | * | 100 | 150 |
| DISSOLVE_SLOW | 6 | * | * | * | * | * | * | 200 |

Event resolution proceeds as follows. The event stream is scanned to find the image position, k, of the next indicated event. If the event stream for image k specifies more than one event, the highest priority event, E, is selected according to Table 3. Other indicated events at position k are removed.

Having found an event E, a second scan is initiated proceeding both forward and backward in the event stream beginning at images k+1 and k−1. If events of equal or lower priority are found in the scan window, these events are removed from the stream. The minimum separation distance specified in the table, minus one, is the length of the scanning window for each equal or lower priority event which may be encountered. Higher priority events are not removed if they occur in the scanning window.

Event resolver 40 produces both a video annotation report and a video timeline. These items are placed in an output file with the video annotation report occurring first. Frame-rate events are always reported and are not altered by event resolver 40.

It should be understood that the invention is not limited to the illustrated embodiment and that a number of substitutions can be made without departing from the scope and teachings of the present invention. For example, although

- segmenting a plurality of the video images, each of the plurality of video images segmented into a first number of cells, each cell comprising a second number of pixels, a pixel having a pixel intensity value representing the intensity of the pixel;
- generating a plurality of cell contrast vectors each associated with one of the segmented video images, each element of the cell contrast vector associated with one of the cells and comprising the standard deviation of the pixel intensity values for the pixels in that cell;
- calculating the maximum cell contrast for each of the segmented video images, the maximum cell contrast for an image comprising the value of the largest element of the cell contrast vector for that image;
- generating a plurality of cell intensity vectors each associated with one of the segmented video images, each element of the cell intensity vector associated with one of the cells and comprising the average of the pixel intensity values for the pixels in that cell;
- calculating the maximum cell intensity for each of the segmented video images, the maximum cell intensity for an image comprising the value of the largest element of the cell intensity vector for that image; and generating a blank image detect signal for a video image if the maximum cell intensity for that video image is below a first threshold and the maximum cell contrast for that video image is below a second threshold.

2. The method of claim 1, wherein each video image comprises a field of a video signal.

3. The method of claim 1, wherein each video image comprises a frame of a video signal.

4. A computerized system for detecting a uniform image in a digital video signal made up of a series of video images, comprising:

a computer-readable medium;

a computer program encoded on the computer-readable medium, the computer program operable to segment a plurality of the video images, each of the plurality of video images segmented into a first number of cells, each cell comprising a second number of pixels, a pixel having a pixel intensity value representing the intensity of the pixel;

generate a plurality of cell contrast vectors each associated with one of the segmented video images, each element of the cell contrast vector associated with one of the cells and comprising the standard deviation of the pixel intensity values for the pixels in that cell;

calculate the maximum cell contrast for each of the segmented video images, the maximum contrast for an image comprising the value of the largest element of the cell contrast vector for that image;

generate a plurality of cell intensity vectors each associated with one of the segmented video images, each element of the cell intensity vector associated with one of the cells and comprising the average of the pixel intensity values for the pixels in that cell;

calculate the maximum cell brightness for each of the segmented video images, the maximum brightness for an image comprising the value of the largest element of the cell intensity vector for that image; and generate a blank image detect signal for a video image if the maximum cell brightness for that video image is below a first threshold and the maximum cell contrast for that video image is below a second threshold.

5. The computerized system of claim 4, wherein each video image comprises a field of a video signal.

6. The computerized system of claim 4, wherein each video image comprises a frame of a video signal.

7. A computerized system for detecting video events in a digital video signal made up of a series of video images, comprising:

a computer-readable medium; and a computer program encoded on the computer-readable medium, the computer program further operable to segment a plurality of the video images, each of the plurality of video images segmented into a first number of cells, each cell comprising a second number of pixels, a pixel having a pixel intensity value representing the intensity of the pixel;

generate a plurality of cell contrast vectors each associated with one of the segmented video images, each element of the cell contrast vector associated with one of the cells and comprising the standard deviation of the pixel intensity values for the pixels in that cell;

generate a cut-detect signal for a video image in response to the change in cell contrast vector for that video image relative to a second video image in said series, the cut-detect signal indicating an abrupt transition from one camera shot to another in the digital video signal; and generate a blank image detect signal for a video image in response to the cell contrast vector for that video image, the blank image detect signal indicating a blank image in the digital video signal.

8. The computerized system of claim 7, the computer program further operable to:

generate a plurality of cell intensity vectors each associated with one of the segmented video images, each element of the cell intensity vector associated with one of the cells and comprising the average of the pixel intensity values for the pixels in that cell;

generate a fade-detect signal for a segmented video image in response to the change in cell intensity vector for that image relative to a second video image in said series, the fade detect signal indicating a transition between a scene and a uniform image in the digital video signal.

9. The computerized system of claim 7, the computer program further operable to:

generate a dissolve-detect signal for a segmented video image in response to the change in cell contrast vector for that image relative to a second video image in said series, the dissolve-detect signal indicating a transition from a first camera shot to a second camera shot in the digital video signal, the transition comprising a plurality of video images comprising a weighted average of the first and second camera shots.

10. The computerized system of claim 7, the computer program further operable to:

generate a plurality of cell intensity vectors each associated with one of the segmented video images, each element of the cell intensity vector associated with one of the cells and comprising the average of the pixel intensity values for the pixels in that cell;

calculate the maximum cell intensity for each of the segmented video images, the maximum cell intensity for an image comprising the value of the largest element of the cell intensity vector for that image; and generate a blank image detect signal for a video image if the maximum cell brightness for that video image is below a third threshold and the maximum cell contrast for that video image is below a fourth threshold.

11. The computerized system of claim 7, the computer program further operable to:

generate a plurality of inter-image similarity values each associated with one of the segmented video images, the inter-image similarity signal for a video image comprising the cosine of the angle between the cell contrast vector for that video image and the cell contrast vector for another video image;

generate five run length values by processing the inter-image similarity values, each run length value associated with one of five finite state machines having five states—A, B, C, D, and E, each state machine initialized in a unique one of the five states and with a run length value of zero, the five states connected in a ring, a state transition occurring each time an inter-image similarity value is computed and processed by the state machine, the run length increasing by one in states A and D, the run length increasing by one in states B, C, and E if the inter-image similarity value being processed exceeds a threshold, the run length being reset to zero if the inter-image similarity value is less than the threshold;

compute a combined run length comprising the maximum run length value; and generate a film-detect signal if the combined run length value exceeds a seventh threshold.

12. The computerized system of claim 8, the computer program further operable to:

generate a dissolve-detect signal for a segmented video image in response to the change in cell contrast vector for that image relative to a second video image in said series, the dissolve-detect signal indicating a transition from a first camera shot to a second camera shot in the digital video signal, the transition comprising a plurality of video images comprising a weighted average of the first and second camera shots.

13. The computerized system of claim 12, the computer program further operable to:

calculate the maximum cell intensity for each of the segmented video images, the maximum cell intensity for an image comprising the value of the largest element of the cell intensity vector for that image; and generate a blank image detect signal for a video image if the maximum cell brightness for that video image is below a third threshold and the maximum cell contrast for that video image is below a fourth threshold.

14. The computerized system of claim 13, the computer program further operable to:

generate a plurality of inter-image similarity values each associated with one of the segmented video images, the inter-image similarity signal for a video image comprising the cosine of the angle between the cell contrast vector for that video image and the cell contrast vector for another video image;

generate five run length values by processing the inter-image similarity values, each run length value associated with one of five finite state machines having five states—A, B, C, D, and E, each state machine initialized in a unique one of the five states and with a run length value of zero, the five states connected in a ring, a state transition occurring each time an inter-image similarity value is computed and processed by the state machine, the run length increasing by one in states A and D, the run length increasing by one in states B, C, and E if the inter-image similarity value being processed exceeds a threshold, the run length being reset to zero if the inter-image similarity value is less than the threshold;

compute a combined run length comprising the maximum run length value; and generate a film-detect signal if the combined run length value exceeds a seventh threshold.

* * * * *